(12) United States Patent
Osborn et al.

(10) Patent No.: US 7,475,953 B2
(45) Date of Patent: Jan. 13, 2009

(54) SOFT-STOP BRAKING CONTROL

(75) Inventors: Douglas Charles Osborn, Royal Oak, MI (US); James Andrew Techentin, Hartland, MI (US)

(73) Assignee: Kelsey-Hayes Company, Livonia, MI (US)

( * ) Notice: Subject to any disclaimer, the term of this patent is extended or adjusted under 35 U.S.C. 154(b) by 37 days.

(21) Appl. No.: 11/346,755

(22) Filed: Feb. 3, 2006

(65) Prior Publication Data

US 2007/0182243 A1   Aug. 9, 2007

(51) Int. Cl.
*B60T 8/86* (2006.01)

(52) U.S. Cl. ............................... 303/125; 303/155

(58) Field of Classification Search ............... 303/193, 303/167, 191, 121, 155, 125, 20
See application file for complete search history.

(56) References Cited

U.S. PATENT DOCUMENTS

| | | | | |
|---|---|---|---|---|
| 3,829,167 A * | 8/1974 | Rouf et al. | ............ | 303/176 |
| 4,833,469 A * | 5/1989 | David | ............ | 340/901 |
| 4,852,950 A * | 8/1989 | Murakami | ............ | 303/192 |
| 4,986,611 A * | 1/1991 | Goshima et al. | ............ | 303/156 |
| 5,275,474 A | 1/1994 | Chin | | |
| 5,278,764 A * | 1/1994 | Iizuka et al. | ............ | 701/301 |
| 5,463,384 A | 10/1995 | Juds | | |
| 5,931,547 A * | 8/1999 | Lerner | ............ | 303/193 |
| 5,948,035 A * | 9/1999 | Tomita | ............ | 701/70 |
| 6,249,736 B1 | 6/2001 | Schmidt | | |
| 6,325,469 B1 | 12/2001 | Carson | | |
| 6,582,034 B2 * | 6/2003 | Hara et al. | ............ | 303/157 |
| 6,606,548 B2 * | 8/2003 | Kato et al. | ............ | 701/71 |
| 7,000,998 B2 * | 2/2006 | Hano et al. | ............ | 303/191 |
| 7,125,085 B2 * | 10/2006 | Ohsaki et al. | ............ | 303/119.1 |
| 7,209,221 B2 * | 4/2007 | Breed et al. | ............ | 356/5.02 |
| 2001/0032045 A1 * | 10/2001 | Hano et al. | ............ | 701/80 |
| 2006/0158033 A1 * | 7/2006 | Ohkubo et al. | ............ | 303/191 |

* cited by examiner

*Primary Examiner*—Robert A Siconolfi
*Assistant Examiner*—James K Hsiao
(74) *Attorney, Agent, or Firm*—MacMillan, Sobanski & Todd, LLC

(57) ABSTRACT

A method is provided for applying a soft-stop control to the vehicle brake actuators of a vehicle during a vehicle stop operation. A brake apply operation is detected. A determination is made whether the vehicle speed is below a first threshold stopping speed. Braking pressure to the vehicle actuators is reduced as a function of vehicle speed, vehicle deceleration, and brake apply pressure if the vehicle speed is below the first threshold stopping speed.

19 Claims, 2 Drawing Sheets

SOFT-STOP BRAKING CONTROL

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field of the Invention

This invention relates in general to vehicle braking, and more specifically, to gradual vehicle braking.

2. Description of the Related Art

For vehicle braking systems using a manually applied vacuum braking system or boost assist braking system, pressurized hydraulic braking fluid is applied to the vehicle brake actuators as demanded by the drivers braking demand input. That is, a proportional braking force is applied to the vehicle brake actuators in response to the driver's force exerted on the brake pedal. Applying too much braking pressure to the brake pedal during an end of stop operation may lead to a sudden jolt or jerk stop (i.e., wrap-up) as the vehicle comes to a complete stop. This typically occurs when the driver fails to relieve braking pressure to the vehicle brake pedal so as to ease off the pressure applied. The wrap-up is as displeasing to passengers traveling in a vehicle as it is for the driver of a vehicle. As a result, bringing the vehicle to a gradual stop has been entirely dependent upon the driver's actions of applying just the right amount of force to the vehicle brake pedal by manually easing off the brake pedal so as to reduce wrap-up at the end of stop operation.

BRIEF SUMMARY OF THE INVENTION

The present invention has the advantage of eliminating a hard stop (wrap-up) during an end of the stop braking operation that is most common when the driver is applying more than the required braking pressure to stop the vehicle and fails to reduce brake pressure to the vehicle brake actuator as the vehicle comes to a complete stop. The present invention also has the advantage of monitoring other factors such as secondary braking functions and target sensing to discontinue a soft-stop braking routine and allow for full control of vehicle braking by the driver or for the application of secondary braking operations.

In one aspect of the present invention, a method is provided for applying a soft-stop control to the vehicle brake actuators of a vehicle during a vehicle stop operation. A brake apply operation is detected. A determination is made whether the vehicle speed is below a first threshold stopping speed. Braking pressure to the vehicle actuators is reduced as a function of vehicle speed, vehicle deceleration, and brake apply pressure if the vehicle speed is below the first threshold stopping speed.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
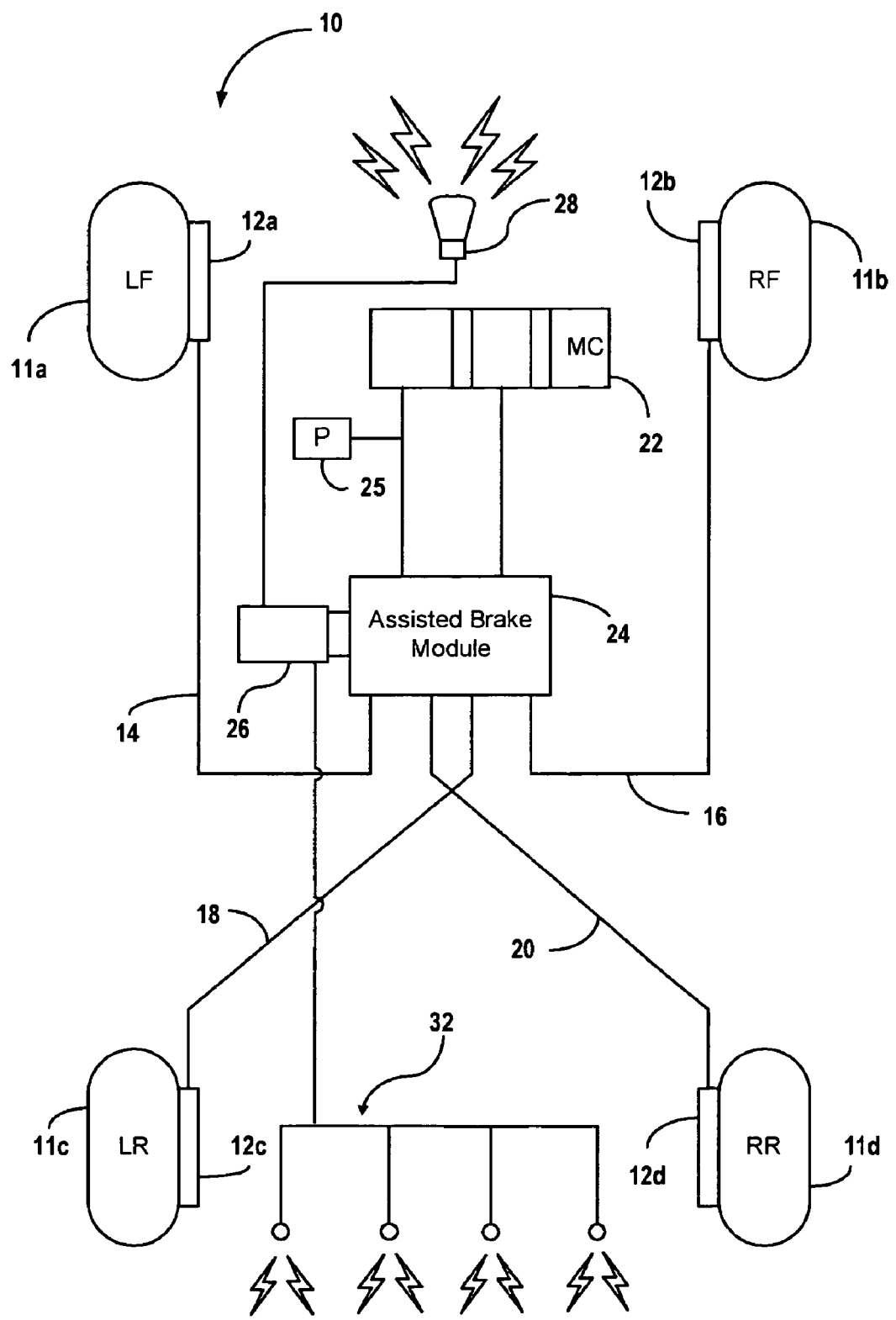
FIG. 1 is a schematic of a vehicle soft-stop system of the present invention.

Referring now to the Drawings and particularly to FIG. 1, there is shown a schematic diagram of a vehicle and its associated hydraulic braking system and target sensing system. The vehicle is shown generally at 10 and includes vehicle wheels 11a, b, c, d. The hydraulic braking system includes vehicle brake actuators 12a, b, c, d with each vehicle brake actuator including a respective brake actuation member (slave cylinder) and friction member actuable by the actuation member for engaging a rotatable braking surface of the vehicle wheels 11a, b, c, d respectively. Braking fluid circuits 14, 16, 18, 20 provide braking fluid from a source of pressurized brake fluid such as a manually operated master cylinder 22 for pressurizing vehicle brake actuators 12a, b, c, d respectively.

A vehicle brake control module 24 may be used in cooperation with the master cylinder 22 to provide primary braking functions (i.e., as demanded by a driver) and secondary braking functions (i.e., automated vehicle stability control functions). Various hydraulically controlled valves (not shown) within the brake control module 24 control the hydraulic pressure to the four vehicle brake actuators 12a, b, c, d either independently or in combination for performing various deceleration or stability control operations. A pressure sensor 25 is coupled to at least one fluid circuit for sensing hydraulic pressure output from the master cylinder 22 via the respective fluid circuit.

Secondary braking functions are invoked for maintaining a function of vehicle stability control. Such secondary braking functions are automatically implemented in response to either a driver's brake apply demand when vehicle stability issues are occurring (e.g., ABS functionality) or when a vehicle encounters stability control problems without a driver's braking apply demand (e.g., traction control functionality). Other secondary braking functions may include vehicle stability control functionality (VSC), yaw stability control functionality (YSC), corner brake control (CBC), dynamic rear proportioning (DRP), and deceleration based isolation (DBI).

The vehicle 10 is also shown to include a target proximity sensing system 26. The target is meant to include a person, vehicle, moving or stationary object detectable by the target proximity sensing system 26. The target proximity sensing system 26 may include a forward target sensing unit 28, such as an adaptive cruise control system (ACC) sensor. The ACC typically includes a radar sensor that senses the proximity of a target forward of the vehicle 10. The target proximity sensing system 26 may also include a rear proximity sensing unit 32 that senses targets rearward of the vehicle 10 such as backup sensors for detecting such targets as a person, vehicle, or object.

The brake control module 24 also controls the soft-stop control functions of the present invention. Soft-stop control functions automatically reduce braking pressure during a vehicle stop when the vehicle is within a predetermined speed range for bringing the vehicle to a gradual stop while avoiding a hard stop jerk that is typically the result of a driver having more pedal pressure than that which is required to stop the vehicle in a reasonably short distance when braking. Soft-stop would only be applied to vehicle stops made without the assistance of other forms of secondary braking control functions being active (e.g., ABS active). The intent is to eliminate the sudden end of a stop wrap-up by reducing braking pressure by 25-75%.

To activate the soft-stop algorithm, the braking control unit 24 must detect a brake apply operation and the vehicle speed must be between a first threshold stopping speed and a second threshold stopping speed. The brake apply operation may be detected by a brake switch, the master cylinder pressure being greater than a predetermined stop pressure threshold, or sensing the travel of the brake pedal beyond a predetermined brake pedal distance threshold. Requiring the vehicle speed to be below the first threshold stopping speed, typically between 3 and 10 mph, allows the vehicle to be stopped within the substantially same stopping distance as intended by the driver. Otherwise, reducing pressure to the vehicle brake actuators while the vehicle has too much inertia may lead to the vehicle stopping significantly beyond the drivers intended stopping location. The intention of the soft-stop routine is to eliminate the vehicle wrap-up while substantially maintaining the intended stopping distance as intended by the driver.

In addition to the above conditions being met, all secondary braking functions must be inactive. If any secondary braking function is active, then the brake control module 24 will not activate the soft-stop routine. In addition, if any secondary braking function becomes active while the soft start routine is active, the brake control module 24 will deactivate the soft-stop routine as secondary braking operations take priority over the soft-stop functions.

The brake control unit 24 is also in communication with the target proximity sensing system 26. When the soft-stop routine is activated or prior to the soft-stop routine being activated, sensed outputs from the target proximity sensing system 26 are provided to the brake control module 24 for sensing the proximity of a target forward or rearward of the vehicle 10. If at any time a target as sensed by the target proximity sensing system 26 is within a target distance threshold, then the soft-stop routine is deactivated (if presently in an activation state) or is prevented from being activated (if presently in a deactivation state).

When the soft-stop routine is activated, the brake control module 24 modulates (e.g., energizes and de-energizes) respective hydraulically controlled valves for reducing hydraulic pressure to the vehicle brake actuators 12*a,b,c,d* for gradually bringing the vehicle to a gradual stop without wrap-up at the end of stop operation. If a secondary braking function becomes active, or a target is sensed within the target distance threshold, or the master cylinder pressure is below the predetermined stop pressure threshold while the soft start routine is active, then the soft-stop routine is immediately deactivated and full braking apply control as demanded by the driver is applied. For example, activation of a secondary braking operation would indicate that a stability control issue is occurring and the brake control module 24 is currently attempting to correct the condition.

Another example of which would deactivate the soft-stop routine includes sensing a target in the trajectory travel path of the vehicle within the target distance threshold. For safety purposes, the soft-stop routine is discontinued to allow the driver to perform an immediate stop, if required.

Yet another example of which would deactivate the soft-stop routine includes sensing a drop in the master cylinder pressure below a predetermined pressure threshold. Such a pressure reduction in the master cylinder would indicate the driver is attempting to intentionally relieve braking pressure. The soft-stop routine would be discontinued and full braking apply control is provided to the driver.

Once the vehicle is traveling less than the second threshold stopping speed, typically 2-5 mph, wrap-up is no longer an issue and full braking control is provided to the driver. This allows the driver to have full control over the brake pressure applied to the brake actuators for maintaining the vehicle in a stopped position as intended by the driver. The advantage is to reduce the braking pressure applied to the vehicle brakes actuators while the vehicle is traveling within a predetermined speed range for eliminating wrap-up.

Figure 2:
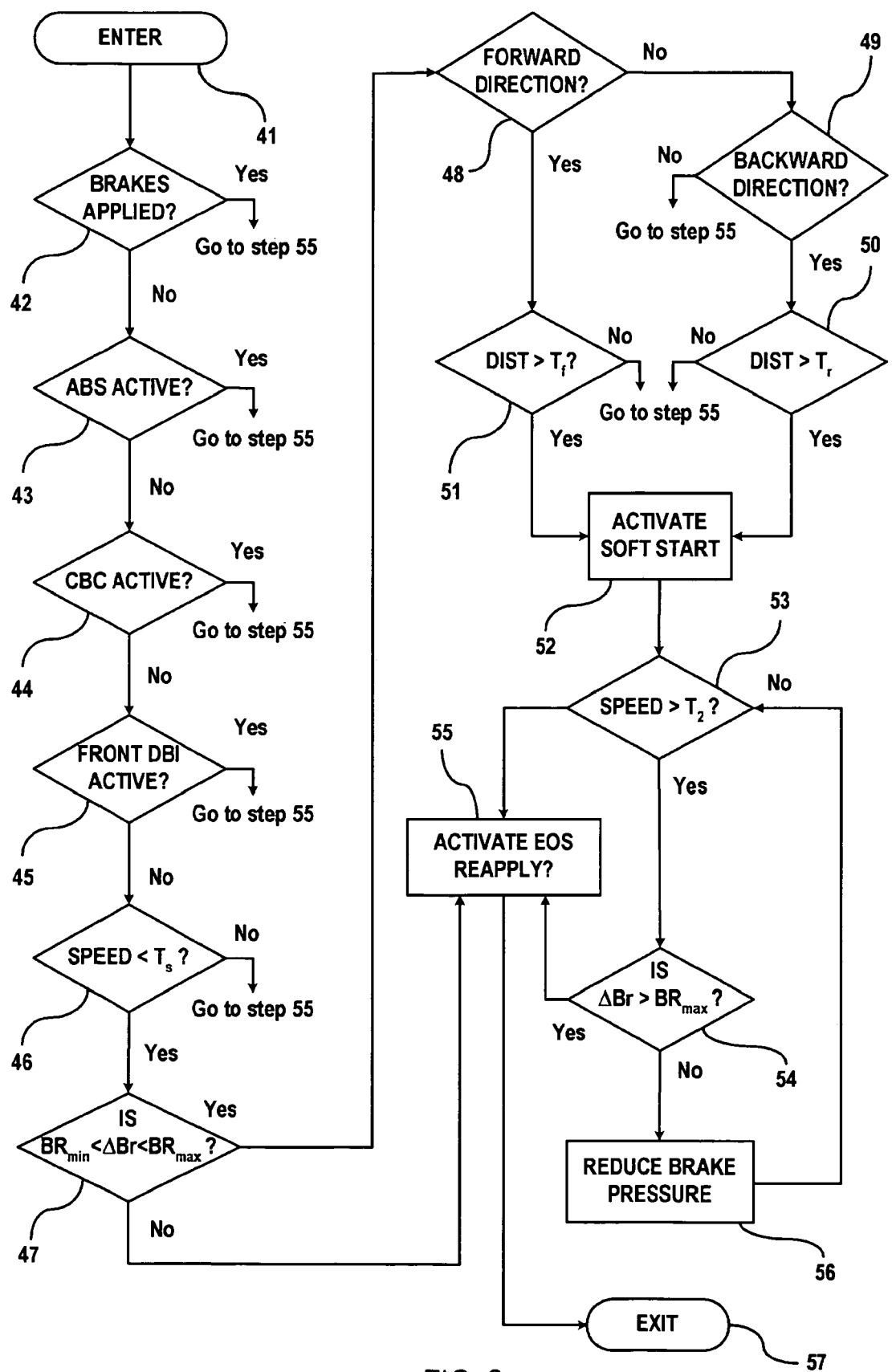
FIG. 2 is a flowchart for a method for a soft-stop routine of the present invention.

FIG. 2 is a method for applying a soft-stop braking routine during an end of stop operation. In step 41, a routine is initiated for determining whether to activate a soft-stop algorithm. In step 42, a determination is made whether the vehicle brakes have been applied by the driver of the vehicle. A brake apply operation by the driver is typically sensed by a brake switch being actuated, or by sensing of the brake pedal travel beyond a predetermined pedal distance travel, or when the master cylinder pressure is above a predetermined pressure threshold. Pressure output by the master cylinder being above a predetermined pressure threshold could indicate that that pressure is being applied to the vehicle brakes but due to an inoperable brake switch or brake pedal travel sensor, the system has not identified the brake apply operation. If either the brake switch, braking pedal travel sensor, or master cylinder pressure does not indicate a brake apply operation is being demanded by the driver, then the routine is exited in step 57. If the determination is made in step 42 that a brake apply operation is occurring, then a determination is made whether any secondary braking functions are active.

In step 43, a determination is made whether an anti-lock braking function is active. If the anti-lock braking function is active, then the routine is exited in step 57. If the anti-lock braking function is inactive, then the routine proceeds to step 44.

In step 44, a determination is made as to whether the corner brake control function is active. If the corner brake control function is active, then the routine is exited in step 57. If the corner brake control function is inactive, then the routine proceeds to step 45.

In step 45, a determination is made whether the front deceleration based isolation function is active. If the front deceleration based isolation function is active, then the routine is exited in step 57. If the front deceleration based isolation function is inactive, then the routine proceeds to step 46.

In step 46, a determination is made whether the vehicle speed is less than the first threshold stopping speed. The first threshold speed may be a predetermined value, or may be calculated as a function of the vehicle's rate of deceleration. If the vehicle speed is greater than the first threshold stopping speed, then the routine is exited in step 57. If the vehicle speed is less than the first threshold stopping speed, then the routine proceeds to step 47.

In step 47, a determination is made whether the rate of change of the driver's braking effort (brake apply pressure) is within a predetermined braking rate threshold. A rate of change greater than the predetermined braking rate threshold indicates that the driver is increasing braking efforts faster than what is typically expected and it is determined that the driver's intent is to stop the vehicle immediately. A rate of change less than the predetermined braking rate threshold indicates that the driver braking efforts are decreasing (i.e., while the vehicle speed is below the first threshold speed) and it is determined that the driver is relieving braking pressure intentionally to manually perform a soft stop. The braking efforts of the driver can be determined by the master cylinder pressure or brake pedal travel. If the determination is made that the rate of change of the driver's braking effort is outside of the predetermined braking rate threshold, then the routine is exited via step 53. If the braking effort is within the predetermined braking rate threshold, then the routine proceeds to step 48.

In step 48, a determination is made whether the vehicle is traveling in a forward direction. If the vehicle is traveling in a forward direction, then a determination is made in step 51 as to whether a target is within the forward trajectory path of the vehicle and whether the target is within a target distance threshold. If the target is within the target distance threshold, then the routine is exited in step 57. If the target is not within the target distance threshold, then the routine proceeds to step 52 where the soft start algorithm is activated.

In step 48, if the determination is made that the vehicle is not traveling in a forward direction, then a determination is made in step 49 as to whether the vehicle is traveling in a rearward direction. If the vehicle is not traveling in the rearward direction, then the vehicle may be already stopped which would not require the activation of the soft-stop algorithm. The routine is then exited in step 57. If the vehicle is traveling in a rearward direction, then a determination is made in step 50 as to whether a target is sensed by the rear target sensing unit and if the target is within a target threshold distance. If the determination is made that the target is within the target distance threshold, then the routine is exited in step 57. If the determination is made in step 50 that the target is not within the target distance threshold, then the soft start algorithm is activated in step 52.

In step 53, a determination is made as to whether the vehicle speed is greater than that a second threshold stopping speed. The second threshold speed may be a predetermined value, or may be calculated as a function of the vehicle's rate of deceleration. The inertia of the vehicle must be at least at a minimum speed for the soft-stop control to be effective, otherwise, soft-stop will have little or no advantageous effect on the end of stop operation. As a result, a vehicle traveling at a speed less than the second threshold stopping speed will not utilize soft-stop operation or discontinue use of the soft-stop operation. The routine is then exited via step 55. An end of stop (EOS) is activated in which full braking control is returned to the driver's control in step 55.

If the determination is made in step 53 that the vehicle speed is greater than the second threshold stopping speed, then a determination is made in step 54 whether the rate of change of the driver's braking effort is greater than the predetermined braking rate threshold which would indicate that the driver is increasing the braking pressure to abruptly stop the vehicle instead of softly stopping the vehicle. If the determination is made that the rate of change of the driver's braking effort is greater than the predetermined braking rate threshold, then the routine is exited via step 55. If the rate of change of the braking effort is not greater than the predetermined braking rate threshold, then the braking pressure to the vehicle brake actuators are reduced, typically by 25-75%, in step 56 for performing a soft-stop operation to the vehicle.

After braking pressure is reduced in step 56, the routine returns to step 53 to continuously check vehicle speed and the driver's braking efforts, respectively, for maintaining a reduced braking pressure. The reduced braking pressure can be a continued reduction in pressure or the holding of the targeted pressure. If the determination is made in step 53 that the vehicle speed is less than the second threshold stopping speed, then full the soft-stop algorithm is discontinued and full braking control is returned to the driver's control in step 55. This allows the driver to have full control over the brake pressure applied to the brake actuators for maintaining the vehicle in a stopped position. The routine is exited in step 57.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for applying a soft-stop control to the vehicle brake actuators of a vehicle during a vehicle stop operation, said method comprising the steps of:

detecting a brake apply operation as demanded by the driver having a brake demand greater than a predetermined threshold;

determining if the vehicle speed is between a first threshold stopping speed and a second threshold stopping speed; and reducing braking pressure to said vehicle brake actuators as a function of vehicle speed, vehicle deceleration, and brake apply pressure if said vehicle speed is between said first threshold stopping speed and said second threshold stopping speed;

wherein said step of reducing said braking pressure is discontinued and said brake apply operation as demanded by the driver is resumed when said vehicle speed becomes less than said second predetermined stopping speed.

2. The method of claim 1 further comprising the step of determining if a secondary braking function is active, wherein said step of reducing said braking pressure is discontinued if a secondary braking function is active during said brake apply operation.

3. The method of claim 2 wherein said secondary braking function includes an anti-lock braking function.

4. The method of claim 2 wherein said secondary braking function includes a corner brake control function.

5. The method of claim 2 wherein said secondary braking function includes a deceleration based isolation function.

6. The method of claim 1 further comprising the step of sensing for a target proximate to said vehicle, wherein said step of reducing said braking pressure is discontinued if a target is sensed within a target distance threshold of said vehicle.

7. The method of claim 6 wherein said target is sensed forward of said vehicle.

8. The method of claim 6 wherein said target is sensed rearward of said vehicle.

9. The method of claim 1 wherein said step of detecting a brake apply operation comprises sensing said master cylinder pressure greater than a predetermined stop pressure threshold.

10. The method of claim 1 wherein said step of detecting a brake apply operation comprises sensing an activation of a brake switch.

11. The method of claim 1 wherein said step of detecting a brake apply operation comprises sensing a travel of a brake pedal greater than a predetermined brake pedal distance threshold.

12. The method of claim 1 wherein said step of reducing said braking pressure is discontinued if a rate of change of said brake apply pressure is outside of a predetermined braking rate threshold.

13. The method of claim 12 wherein said rate of change of said brake apply pressure is determined by sensing a rate of change of said master cylinder pressure.

14. The method of claim 12 wherein said rate of change of said brake apply pressure is determined by sensing a change in a travel distance of a brake pedal.

15. A method for applying a soft-stop control to the vehicle brake actuators of a vehicle during a vehicle stop operation, said method comprising the steps of:
   detecting a brake apply operation by a driver in response to a master cylinder pressure being above a predetermined braking rate threshold;
   determining that a secondary brake operation is inactive;
   determining that a vehicle speed is between a first threshold stopping speed and a second threshold stopping speed;
   reducing brake pressure to said vehicle brake actuators as a function of said master cylinder pressure, said vehicle speed, and a vehicle deceleration if said secondary brake operation is inactive and said vehicle speed is between said first and second threshold stopping speeds;
   discontinuing said step of reducing brake pressure when said vehicle speed is less than said second threshold storming speed; and
   resuming said brake apply operation as demanded by said driver in response to said vehicle speed being less than said second threshold stopping speed.

16. The method of claim 15 further comprising the step of sensing for a target proximate to said vehicle, wherein said step of reducing said braking pressure to said vehicle brakes is discontinued if a target is sensed rearward of said vehicle is within a target distance threshold.

17. The method of claim 15 wherein said step of reducing said braking pressure is discontinued if a rate of change of said brake pressure is outside of a predetermined braking rate threshold.

18. A method for applying a soft-stop control to the vehicle brake actuators of a vehicle during a vehicle stop operation, said method comprising the steps of:
   detecting a brake apply operation by an activation of a brake switch;
   determining that a secondary brake operation is inactive;
   determining that a vehicle speed is between a first threshold stopping speed and a second threshold stopping speed; and
   reducing brake pressure to said vehicle brake actuators as a function of said master cylinder pressure, said vehicle speed, and a vehicle deceleration if said secondary brake operation is inactive and said vehicle speed is between said first and second threshold stopping speed;
   discontinuing said step of reducing brake pressure when said vehicle speed is less than said second threshold storming speed; and
   resuming said brake apply operation as demanded by a driver in response to said vehicle speed being less than said second threshold stopping speed.

19. A method for applying a soft-stop control to the vehicle brake actuators of a vehicle during a vehicle stop operation, said method comprising the steps of:
   detecting a brake apply operation by sensing a travel of a brake pedal greater than a predetermined brake pedal travel threshold;
   determining that a secondary brake operation is inactive;
   determining that a vehicle speed is between a first threshold stopping speed and a second threshold stopping speed;
   reducing brake pressure to said vehicle brake actuators as a function of said master cylinder pressure, said vehicle speed, and a vehicle deceleration if said secondary brake operation is inactive and said vehicle speed is between said first and second threshold stopping speed;
   discontinuing said step of reducing brake pressure when said vehicle speed is less than said second threshold stopping speed; and
   resuming said brake apply operation as demanded by said travel of said brake pedal in response to said vehicle speed being less than said second threshold stopping speed.

* * * * *

UNITED STATES PATENT AND TRADEMARK OFFICE
CERTIFICATE OF CORRECTION

PATENT NO. : 7,475,953 B2 Page 1 of 1
APPLICATION NO. : 11/346755
DATED : January 13, 2009
INVENTOR(S) : Douglas Charles Osborn et al.

It is certified that error appears in the above-identified patent and that said Letters Patent is hereby corrected as shown below:

Column 8, Claim 18, line 6, delete "and";
line 14, delete "storming" and insert --stopping--.

Signed and Sealed this

Third Day of March, 2009

JOHN DOLL
*Acting Director of the United States Patent and Trademark Office*